United States Patent [19]
Nakaura et al.

[11] Patent Number: 6,096,818
[45] Date of Patent: Aug. 1, 2000

[54] FLAME-RETARDANT, ANTISTATIC POLYESTER RESIN COMPOSITION

[75] Inventors: Misuzu Nakaura, Hirakata; Kimihiko Nakano, Kobe; Kazushi Hirobe, Osaka, all of Japan

[73] Assignee: Kaneka Corporation, Osaka, Japan

[21] Appl. No.: 09/077,321

[22] PCT Filed: Oct. 2, 1997

[86] PCT No.: PCT/JP97/03541

§ 371 Date: Jun. 5, 1998

§ 102(e) Date: Jun. 5, 1998

[87] PCT Pub. No.: WO98/15596

PCT Pub. Date: Apr. 16, 1998

[30] Foreign Application Priority Data

Oct. 8, 1996 [JP] Japan ................... 8-267094

[51] Int. Cl.$^7$ .............. C08K 3/16; C08K 5/03; H01B 1/06
[52] U.S. Cl. .......... 524/412; 524/409; 524/411; 524/467; 524/495; 252/511
[58] Field of Search .............. 524/412, 409, 524/411, 467, 495; 252/511

[56] References Cited

U.S. PATENT DOCUMENTS 5,262,470  11/1993  Shimotsuma et al. .......... 524/412

*Primary Examiner*—James J. Seidleck
*Assistant Examiner*—Olga Asinovsky
*Attorney, Agent, or Firm*—Armstrong, Westerman, Hattori, McLeland & Naughton

[57] ABSTRACT

A polyester-type resin composition which has sufficient anti-static property and flame-retardant property, in addition to maintaining mechanical strength and thermal resistance and which is useful for, in particular, electrical and electronic mechanical parts field. The flame-retardant anti-static polyester-type resin composition of the present invention comprises 100 parts by weight of a thermoplastic polyester (A), from 1 to 35 parts by weight of a bromine-type flame-retardant (B), from 0.1 to 5 parts by weight of an antimony compound (C) and from 3 to 12 parts by weight of conductive carbon black (D), wherein the Br/Sb weight ratio in said polyester-type resin composition is in a range from 5.5/1 to 35.0/1. Moreover, a reinforcing filler (E), a crystallizing accelerator (F) and a multifunctional compound (G) can be added in further to the said polyester-type resin composition.

9 Claims, No Drawings

FLAME-RETARDANT, ANTISTATIC POLYESTER RESIN COMPOSITION

TECHNICAL FIELD

The present invention relates to a polyester-type resin composition which has excellent anti-static properties, flame-retardance properties, thermal resistance and mechanical strength and which is preferably used for various uses, in particular for electrical and electronic mechanical parts uses.

BACKGROUND ARTS

Thermoplastic resins represented by polyethylene terephthalate, polytetramethylene terephthalate and the like are used as fibers, films and molded articles hither to, because they have excellent mechanical properties, excellent electrical properties and so on. Further, the mechanical strength and thermal resistance of these thermoplastic polyester resins are highly improved by addition of reinforcing fillers, including glass fibers. Hence the reinforced composition obtained by said method is preferable as a raw material for functional parts.

Recently, a requirement for safety against a fire especially in electrical and electronic fields has been raised. Therefore, an improvement of flame-retardance of resins has been carried out, and resin compositions to which various kinds of flame-retardant are added are commercialized. As flame-retardation methods of polyester-type resin, for example, there are methods disclosed in Japanese Laid-Open Patent Publication No. sho 50-92346 (1975), No. hei4-198357 (1992) and No. hei5-140427(1993), in which a method that halogenated polystyrene resin is added to a thermoplastic polyester resin, a method disclosed in Japanese Laid-Open Patent Publication No. sho 50-35257 and No. sho 62-15256 is that a high molecular weight halogenated bisphenol A-type phenoxy resin is added. On the other hand, as a method to add anti-staticity to thermoplastic resin compositions including polyester-type resin, a method of adding conductive carbon black is well known, such method is disclosed, for example, in Japanese Laid-Open Patent Publication No. sho 49-99734.

Generally, in case where a flame-retardant agent and also a flame-retardant aiding agent are added to a thermoplastic resin in order to give the resin with flame-retardant properties, as reported in books (for example, Jin Nishizawa, "Flame-Retardance of Polymer. The Chemistry and The Actual Technology", TAISEISHA), the formulation ratio of Br in a bromine-type compound used as the flame-retardant agent and Sb in an antimony compound used as the flame-retardant aiding agent in the resin, that means, when the weight ratio of Br/Sb is 3/1, the highest flame-retardant effect can be obtained, and if the ratio differs from 3/1, combustion time will prolong extremely and thus becomes difficult to obtain high-retardance.

However, in case when conductive carbon black is added in order to give anti-static properties to the flame-retardant polyester-type composition in which a flame-retardant and a flame-retardant aid have been added as mentioned above, the above-mentioned Br/Sb weight ratio of the flame-retardant and the flame-retardant aid is adjusted to 1/3 to be used as the above-mentioned general ratio, carbonized combustion which is called as glowing may occur in burning. Accordingly it will not meet to the UL94V Standard. To avert it, the amount of the flame-retardant agent and the flame-retardant aiding agent is increased for improving it, the flame-retardant level may be improved a little though, the mechanical strength, thermal resistance and the like of it may be largely lowered.

Under these circumstances, from the above-mentioned viewpoint, the present invention is to provide a polyester-type resin composition which has sufficient anti-static and flame-retardant properties with maintaining the mechanical strength and thermal resistance thereof.

DISCLOSURE OF THE INVENTION

As a result of the extensive studies to solve the above-mentioned problem, the inventors of the present invention found that the above-mentioned problem can be solved by formulating specific weight ratio of Br/Sb where a bromine-type flame-retardant, antimony compound and conductive carbon black are combiningly added to an thermoplastic polyester for improving its flame-retardant and anti-static properties. Based on these findings, the inventors achieved the present invention.

That is, the present invention provides a flame-retardant along with anti-static polyester-type resin composition which comprises that 100 parts by weight of a thermoplastic polyester (A), from 1 to 35 parts by weight of a bromine-type flame-retardant (B), from 0.1 to 5 parts by weight of an antimony compound (C) and from 3 to 12 parts by weight of conductive carbon black (D), wherein the Br/Sb weight ratio in the said flame-retardant along with anti-static polyester-type resin composition is specified in a range from 5.5/1 to 35.0/1.

In the said resin composition of the present invention, the above-mentioned thermoplastic polyester (A) is obtainable by using terephthalic acid or its derivatives having ability to form esterification as the acid component, and by using a glycol having 2 to 10 carbon atoms or its derivatives having ability to form esterification as the glycol component. As a typical example, polyethylene-terephthalate, polypropylene-terephthalate, polytetramethylene-terephthalate, polyhexamethylene-terephthalate and the like can be exemplified.

And, other components which can be copolymerized with it may be contained therein as long as its flame-retardant and molding properties are not deteriorated. As the above-mentioned copolymerizable components, there can be exemplified divalent or more valent aromatic carboxylic acids having 8 to 22 carbon atoms, divalent or more valent aliphatic carboxylic acids having 4 to 12 carbon atoms, and further, divalent or more valent carboxylic acids such as alicyclic carboxylic acids having 8 to 15 carbon atoms, and these derivatives having ester forming ability, aliphatic compounds having 3 to 15 carbon atoms, alicyclic compounds having 6 to 20 carbon atoms, and aromatic compounds having 6 to 40 carbon atoms together with having two or more hydroxy groups in each molecules, and derivatives from them which have ability to form ester. Concretely, as the carboxylic acids, other than terephthalic acid, there can be exemplified carboxylic acids, such as isophthalic acid, naphthalenedicarboxylic acid, bis(p-carboxyphenyl) methaneanthracenedicarboxylic acid, 4,4'-diphenyldicalboxylic acid, 1,2-bis(phenoxy)ethane-4,4'-dicarboxylic acid, adipic acid, sebacic acid, azelaic acid, dodecanedioic acid, maleic acid, trimesic acid, trimellitic acid, pyromellitic acid, 1,3-cyclohexanedicarboxylic acid, 1,4-cyclohexanedicarboxylic acid, decahydronaphthalenedicarboxylic acid and the like, or derivatives from them which have ester formation ability. As the compounds having hydroxy groups, there can be exemplified other than ethylene glycol, propylene glycol and butanediol, hexanediol, decanediol, neopentyl-glycol, cyclohexanedimethanol, cyclohexanediol, 2,2'-bis(4-hydroxyphenyl)propane, 2,2'-bis(4-hydroxycyclohexyl)propane, hydroquinone, glycerin, pentaerythritol and the like, or derivatives from them which have ester formation ability. And, oxy acids such as p-oxybenzoic acid and p-hydroxyethoxybenzoic acid, or derivatives from them having ester formation ability, and cyclic esters such as ε-caprolactone, can also be usable. Further, polymers containing polyalkylene glycol units which have been partially copolymerized into the polymer chain can also be usable. And as such glycol unit polyethylene glycol, polypropylene glycol, poly(ethylene oxide-propylene oxide) block and/or random copolymer, polyethylene glycol copolymerized with bisphenol A, polytetramethylene glycol or the like can also be usable. The copolymerizable amount of the said components is about 20 wt % or less, preferably 15 wt % or less, more preferably 10 wt % or less.

The above-mentioned thermoplastic polyester can be used alone or in combination of two or more kinds. Among the various kinds of thermoplastic polyester mentioned in the above, a thermoplastic polyester having ethylene terephthalate unit and/or tetramethylene terephthalate unit as its main component is preferable.

The logarithmic viscosity of the above-mentioned thermoplastic polyester (measured with using phenol: 1,1,2,2-tetrachloroethane=1:1 (weight ratio) mixed solvent at 25° C.) is to be 0.35 or more, preferably from 0.44 to 2.0, more preferably from 0.45 to 1.5.

As the above-mentioned bromine-type flame-retardant (B) in the resin composition of the present invention, various kinds of commercially available flame-retardants can be usable. For example, there can be exemplified brominated polystyrene, brominated epoxy resin, brominated phenoxy resin, brominated imide, brominated polycarbonate, polybromobenzylacrylate, brominated diphenylalkane and the like. Among them, brominated polystyrene and brominated diphenylalkane are preferable. The ratio of halogen (Br) incorporated in the brominated flame-retardant is preferably 20 wt % or more, more preferably 25 wt % or more. In case where the ratio of halogen incorporated is below 20 wt %, the flame-retardance is not sufficient, thus it is not preferable. Although the amount of bromine-type flame-retardant to be added is differing depending on what kind of flame-retardant to be used, it may be generally from 1 to 35 parts by weight to 100 parts by weight of the thermoplastic polyester, preferably from 3 to 30 parts by weight, more preferably from 5 to 25 parts by weight. In case of below 1 part by weight, the flame-retardance is not sufficient, thus it is not preferably. In case of exceeding 35 parts by weight, the mechanical strength decreases, thus it is not preferable.

The above-mentioned antimony compound (C) in the resin composition of the present invention is an auxiliary flame-retardant agent, and the flame-retardant effect is remarkably increased by addition in combination with the above-mentioned bromine-type flame-retardant (B). Various kinds of commercially available antimony compound can be usable. For example, there can be exemplified antimony trioxide, antimony pentaoxide, sodium antimonate, antimony tartarate and the like. The amount of such antimony compound to be added is to be from 0.1 to 5 parts by weight of 100 parts by weight of the thermoplastic polyester, preferably from 0.5 to 4 parts by weight, more preferably from 1 to 3.5 parts by weight. In case that the antimony compound is below 0.1 parts by weight, the flame-retardance is not sufficient, thus it is not preferable. Also, in case that the antimony compound exceeds 5 parts by weight, the flame-retardance and the mechanical strength may decrease, thus it is not preferable.

The amounts of the above-mentioned bromine-type flame-retardant (B) and antimony compound (C) in resin composition of the present invention are essential in a range that the weight ratio of Br/Sb is from 5.5/1 to 35.0/1. The weight ratio of Br/Sb is preferably in a range of from 6.0/1 to 32.0/1, more preferably from 6.5/1 to 30.0/1. In a range that the weight ratio of Br/Sb is below 5.5/1, the flowing time cannot be shortened sufficiently, on the other hand, in the range of exceeding 35.0/1, the burning time is prolonged. Thus, in the either range, the enough flame-retardant level which meets to UL94V Standard may not be obtained.

The above-mentioned conductive carbon black (D) in the resin composition of the present invention is used for giving anti-staticity to the resin compound. Commercially available acetylene black or various kinds of furnace-type conductive carbon black of which particle diameter is from of 1 to 500 μm, can be usable. For example, Ketchen Black EC, Ketchen black EC600JD (both are the trade marks of Ketchen Black International) and the like are exemplified. The amount of such conductive carbon black to be added is in a range from 3 to 12 parts by weight to 100 parts by weight of the thermoplastic polyester, preferably from 4 to 11 parts by weight, more preferably from 4.5 to 10 parts by weight. In case where the amount of the conductive carbon black is less than 3 parts by weight, the anti-staticity will not be sufficient. And, in case where the amount exceeds 12 parts by weight, pelletizing by extrusion molding becomes difficult and also the mechanical strength may be deteriorated. Hence, both cases are not preferable.

The mechanical strength and thermal resistance of the resin compound in the present invention can be further improved by adding reinforcing filler (E) on top of the above-mentioned (A)~(D). And as such filler, a conventional filler can be usable without any additional treatment. For example, there can be exemplified glass fibers, carbon fibers, potassium titanate fibers, glass beads, glass flakes, calcium silicate, calcium carbonate, calcium sulfate, magnesium silicate, barium sulfate, mica, talc, kaolin, clay and the like. Among the above-mentioned fillers, fibrous reinforcing agents such as glass fibers, carbon fibers and the like are preferable. Further, it is preferably from the stand point of operational efficiency to use chopped strand glass fibers treated by bundling agent. And, for tight connection between the resin and the above-mentioned fibrous reinforcing agent, it is preferably to pretreat on the surface of the fibrous reinforcing agent with coupling agent, and also preferably to pretreat with binder. As example of the above-mentioned coupling agents, there can be exemplified alkoxysilane compounds such as γ-aminopropyltriethoxysilane, γ-glycidoxypropyltrimethoxysilane and the like, and as examples of the above-mentioned binder, there can be exemplified epoxy resin, urethane resin and the like, however, the invention is not limited to these examples.

The glass fibers to be used as for the above-mentioned fibrous reinforcing agent is preferably having its diameter of about from 1 to 20 μm and its length of about from 0.01 to 50 mm. In case of the fiber length being too short, the reinforcing effect may not be sufficient, on the other hand, in case of the fiber length being too long, surface appearance of its molded article and mold-processability may be deteriorated. Therefore such cases are not preferable.

These reinforcing fillers can be used along or in combination of two or more kinds. The amount of the reinforcing filler to be used may be from 0 to 100 parts by weight to 100 parts by weight of the thermoplastic polyester, preferably from 5 to 80 parts by weight. In case where the amount of the reinforcing filler to be used exceeds 100 parts by weight, flowability of the resin is remarkably lowered and processability may be deteriorated, therefore they are not preferable.

Heat resistance of the resin composition in the present invention can be improved by adding of crystallizing accelerator (F) in addition to the above-mentioned from (A) to (E). As examples of the said crystallizing accelerator, there can be exemplified organic acid salts including sodium p-t-butylbenzoate, sodium montanate, sodium palmitate, calcium stearate and the like; inorganic salts including calcium carbonate, calcium silicate, magnesium silicate, calcium sulfate, barium sulfate and the like; metal oxides including zinc oxide, magnesium oxide, titanium oxide and the like; ionomers including metal salts of ethylene-methacrylic acid copolymer and the like; block copolymers of polyester with monomer units of polyethylene-glycol, polypropylene-glycol, block and/or random copolymer of poly(ethylene oxide-propylene oxide), polyethylene-glycol copolymerized with bisphenol A, polytetramethylene glycol or the like. Among the above-mentioned crystallizing accelerators, sodium p-t-butylbenzoate, sodium montanate, ionomers and block copolymers of ethylene terephthalate with polyethyleneglycol which is copolymerized with bisphenol A are particularly preferably from the standpoint of improvement in mold-processability in addition to improvement of heat stability.

The said crystallizing accelerators can be used along or in a combination of two or more kinds. Although the amount of the crystallizing accelerator to be added is determined in the range that the properties of resin composition of the present invention will not be deteriorated, in case of organic acid salts, from 0.01 to 5 parts by weight to 100 parts by weight of the thermoplastic polyester, and in case of inorganic salts, from 0.1 to 10 parts by weight, and in case of metal oxides, from 0.1 to 10 parts by weight, and in case of ionomers, from 0.1 to 10 parts by weight, and in case of block copolymers consisting of polyalkylene glycol units, from 5 to 60 parts by weight.

Further, the mechanical strength of resin composition in the present invention can be improved by adding polyfunctional compounds (G). The above-mentioned polyfunctional compound means a compound having two or more functional groups, which are enable to react easily with either OH groups or COOH groups of the polyester, or which produce such functional components by heat or other decomposing methods. As examples of such functional groups having reactivity with the polyester, there can be exemplified epoxy group, carbodiimide group, oxazoline group, osocyanate group, carboxylic acid group, carboxylic anhydride group, acid halide compound and the like. Among them, a functional group which is selected from group consisting of epoxy group, carbodiimide group and oxazoline group is preferable from the standpoints of reactivity, byproduct generated by its reaction and the like.

As above-mentioned compound having epoxy groups, there can be exemplified bisphenol-type epoxy resins, brominated bisphenol-type epoxy resins, novolac-type epoxy resins, multivalent aliphatic or alicyclic or aromatic glycidyl ether compounds, polyvalent aliphatic or alicyclic or aromatic glycidyl ester compounds, epoxy compounds which are prepared by epoxidation of a compound having plural unsaturated functional groups with acetic acid and peracetic acid, multivalent aliphatic or alicyclic or aromatic clycidy-lamine compounds, copolymers of olefin and (metha) acrylic acid glycidyl ester and the like. As concrete examples of the said compounds, there can be exemplified bisphenol A-type epoxy compounds, bisphenol A-type epoxy resins, brominated bisphenol A-type epoxy resins, novolac-type epoxy resins, alkylene glycol diglycidyl ethers such as ethylene glycol diglycidyl ether, propylene glycol diglycidyl ether, tetramethylene glycol diglycidyl ether, neopentyl glycol diglycidyl ether, 1,6-hexanediol diglycidyl ether and the like, polyalkylene glycol diglycidyl ethers such as polyethylene glycol diglycidyl ether, polybutanediol diglycidyl ether, polypropylene glycol diglycidyl ether, polyneopentyl glycol diglycidyl ether, polytetramethylene glycol diglycidyl ether and the like, dibromoneopentyl glycol diglycidyl ether, resorcinol diglycidyl ether, erythritol polyglycidyl ether, trimentylolpropane polyglycidyl ether, pentaerythritol polyglycidyl ether, hydroquinone diglycidyl ether, diglycerol polyglycidyl ether, polyglycerol polyglycidyl ether, solbitan polyglycidyl ether, solbitol polyglycidyl ether, bisphenol S diglycidyl ether, terephthalic acid diglycidyl ester, isophthalic acid diglycidyl ester, adipic acid diglycidyl ester, diglycidylaniline, tetraglycidyl-4,4'-diaminodiphenylmethane, triglycidyltris(2-hydroxyethyl) isocyanurate, polyepoxy compound of high classed fat, ethylene-glycidyl methacryilate copolymer and the like. Among them, (brominated) bisphenol A-type epoxy resins and/or novolac-type epoxy resins are preferably in standpoint of physical characteristics balance of its molded articles and the like. These resins are commercialized as, for example, epicoat828 and epicoat152 (both are trade marks of Yuka Shell Epoxy Co.)

The above-mentioned compounds having carbodiimide groups mean that a compound having at least two or more carbodiimide groups represented by (—N=C—N—) in its molecule. These compounds can be prepared, for example, by decarboxylation reaction of organic isocyanate under heated condition in presence of a proper catalyst. As examples of the multifunctional carbodiimide compounds, there can be exemplified polycarbodiimides such as poly(1, 6-hexamethylene carbodiimide), poly[4,4 -methylenebis (cyclohexylcarbodiimide)], poly(1,3-cyclohexylenecarbodiimide), poly(1,4-cyclohexylenecarbodiimide) and the like, aromatic polycarbodiimides such as poly(4,4'-diphenylmethanecarbodiimide), poly(3,3'-dimethyl-4,4'-diphenylmethanecarbodiimide), poly (naphthylenecarbodiimide), poly(p-phenylenecarbodiimide), poly(m-phenylenecarbodiimide), poly(tolylcarbodiimide), poly(diisopropylcarbodiimide), poly(methyldiisopropylphenylenecarbodiimide), poly (triethylphenylenecrbodiimide), poly (triisopropylphenylenecarbodiimide) and the like. Among then, aromatic polycarbodiimides are preferable from standpoint of physical property balance of the resin obtained from them. As an example of commercially available products of these, Stavacsol P produced by Bayer A.G. and such others can be exemplified.

The above-mentioned compound having oxazoline groups of the present invention is a compound having at least two or more oxazoline groups in each molecule. As concrete examples, there can be exemplified 2,2'-methylenebis(2-oxazoline), 2,2'-methylenebis(4-methyl-2-oxazoline), 2,2'-methylenebis(4-ethyl-2-oxazoline), 2,2'-ethylenebis(2-oxazoline), 2,2'-ethylenebis(4-methyl-2-oxazoline), 2,2'-ethylenebis(4-ethyl-2-oxazoline), 2,2'-propylenebis(2-oxazoline), 2,2'-tetramethylenebis(2-oxazoline), 2,2'-hexamethylenebis(2-oxazoline), 2,2'-octamethylenebis(2-oxazoline), 2,2'-p-phenylenebis(2-oxazoline), 2,2'-o-phenylenebis(2-oxazoline), 2,2'-m- phenylenebis(2-oxazoline), 2,2'-p-phenylenebis(4-methyl-2-oxazoline), 2,2'-o-phenylenebis(4-methyl-2-oxazoline), 2,2'-m-phenylenebis(4-methyl-2-oxazoline), 2,2'-p-phenylenebis(4-ethyl-2-oxazoline), 2,2'-o-phenylenebis(4-ethyl-2-oxazoline), 2,2'-m-phenylenebis(4-ethyl-2-oxazoline), 2,2'-phenylenebis(4,4'-dimethyl-2-oxazoline), 2,2'-p-phenylenebis(4-phenyl-2-oxazoline), 2,2'-bis(2-oxazoline), 2,2'-bis(4-methyl-2-oxazoline), 2,2'-bis(4-ethyl-2-oxazoline), 2,2'-bis(4-phenyl-2-oxazoline), 2,2'-bis(4,4'-dimethyl-2-oxazoline), tri(2-oxazoline)methane, 1,2,2-tri(2-oxazoline)ethane, 1,1,3-tri(2-oxazoline)propane, 1,2,3-tri(1-oxazoline)propane, 1,1,4-tri(2-oxazoline)butane and the like. Among them, divalent oxazoline compounds are preferable from the standpoint of physical property balance.

These multifunctional compounds are used along or in combination of two or more kinds of compound. The amount of such multifunctional compound (G) to be used is in a range from 0.05 to 5 parts by weight to 100 parts by weight of the thermoplastic polyester (A), preferably from 0.1 to 3 parts by weight, more preferably from 0.15 to 2 parts by weight. In case that the amount of the multifunctional compound is below 0.05 parts by weight, the improvement effect for mechanical strength of its molded article is low, on the other hand, in case that the amount is over 5 parts by weight, flowability of the obtained resin composition is lowered, and thus its mold-processability may be deteriorated clearly, therefore, the mechanical strength of its molded article may be lowered, hence these cases are not preferable.

In further, heat stabilizers including antioxidants and the like can also be usable to the flame-retardant resin compositions of the present invention if necessary. As examples of such stabilizer, there can be exemplified phenol-type antioxidants such as pentaerythrityl-tetrakis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, n-octadecyl-3-(3',5'-di-t-butyl-4'-hydroxyphenyl)propionate, N,N'-bis-3-(3',5'-di-t-butyl-4-hydroxyphenyl)propionylhexamethylenediamine, tris(3,5-di-t-butyl-4-hydroxybenzyl)isocyanurate and the like, phosphorus-type antioxidants such as tris(2,4-di-t-butylphenyl)phosphite, distearylpentaerythritol-diphosphite, bis(2,6-di-t-butyl-4-methylphenyl)pentaerythritol-diphosphite and the like, and thioether-type antioxidants such as distearyl-3,3'-thiodipropionate, pentaerythritol-tetrakis(β-laurylthiopropionate) and the like.

In addition to the above-mentioned additives, one or more kinds of generally known additives such as lubricants, releasing agents, plasticizers, ultraviolet absorbers, light stabilizers, pigments, dyes, dispersants, compatibilizers, antibacterial agents or the like can additionally be added into the composition of the present invention if necessary.

In further, one or more kinds of other thermoplastic or thermosetting resin, for example, unsaturated polyester-type resins, liquid crystal polyester-type resins, polyester-ester elastomer-type resins, poly ester-ether elastomer-type resins, polyolefin-type resins, polystyrene-type resins, polyamide-type resins, polycarbonate-type resins, rubber-reinforced-styrene-type resins, polyphenylene sulfide-type resins, polyphenylene ether-type resins, polyacetal-type resins, polysulfone-type resins, polyacrylate-type resins or the like can be combiningly added in the resin composition of the present invention as far as its objected property will not be deteriorated.

The production process of the above-mentioned polyester-type resin composition of the present invention is not limited particularly. For example, it can be produced by a process that after dry of the above-mentioned (A) to (G) components, other additives and resins, the composition is melt-kneaded with using a melt-kneaded like single or twin screw extruder.

The molding process for the thermoplastic polyester-type resin composition of the present invention is also not limited particularly. Therefore, molding process which are generally applied to thermoplastic resins can be applicable. Namely various molding process such as injection molding, blow molding, extrusion molding, sheet molding, roll molding, press molding, lamination molding, film molding by melt-casing, spinning or the like can be applicable.

BEST MODE FOR CARRYING OUT THE INVENTION

The present invention will be described in more detail with reference to the following examples, but the present invention is not limited by these examples. And, hereinafter, "parts" represents parts by weight and "%" represents weight %, unless otherwise stated.

REFERENCE EXAMPLE 1

3,500 g of polyethylene terephthalate oligomer (average polymerization degree is about from 5 to 8) which has been prepared by synthesized with using antimony trioxide as a catalyst, 1,500 g of bisphenyl A copolymerized with ethylene oxide of which average molecular weight is about 1,000, and 25 g of stabilizer (trademark/AdekastabA0-60: a product of ASAHI DENKA KOGYO K.K.) were put into a 10 L volume autoclave (made by Nippon Taiatsu Glass Co.) After the mixture was heated to 290° C. with stirring in a stream of nitrogen, the pressure was reduced to 1 torr or less. After the pressure became 1 torr or less, the mixture was stirred for 3 hours. Then, the pressure was turn back to atmospheric pressure with using nitrogen to terminate the polymerization, and a copolymer (1) (crystallizing accelerator F-1) was obtained. The logarithmic viscosity of the obtained copolymer was 0.7.

EXAMPLE 1

100 part of polyethylene terephthalate (A-1) having 0.6 of its logarithmic viscosity as a thermoplastic polyester, 18 parts of brominated polystyrene (B-1) (trademark/Pilocheck68PB: made by Nissan Phero Yuki Kagaku Co.: 68% of bromine content ratio) as a bromine-type flame-retardant, 2 parts of antimony trioxide (C-1) (trademark/Antimony Oxide C: made by SUMITOMO METAL MINING CO., LTD.) as an antimony compound, 7.7 parts of conductive carbon black (D-1) (trademark/Ketchen Black EC600JD: made by Ketchen Black International Co.), 20 parts of copolymer of Reference Example 1 (F-1) as a crystallizing accelerator (F), 0.2 parts of sodium p-t-butylbenzoate (F-2) (trademark/Nonsal TBAN: made by Nippon Yushi Corporation), and 3.5 parts of partial sodium salt of ethylene-methacrylic acid copolymer (F-3) (trademark/HIMILAN 1707: made by Mitsui-Dupont Co.: its neutralization ratio is 50%) as a crystallizing accelerator (F), 0.5 parts of divalent oxazoline compound (G-1) (trademark/Bisoxazoline 1,3-PBO: made by TAKEDA CHEMICAL INDUSTRIES, LTD.) as a multifunctional compound, and 0.5 parts of AdekastabA0-60 as a stabilizer were added in any mixed. And then the mixture was put into the hopper of a twin screw extruder equipped with a vent (trademark/TEX44: made by Japan Steel Works, Ltd.), of which barrel temperature was set at 280° C. And the mixture was melt-kneaded together with adding 40 parts of glass fibers (E-1) (trademark/T-195H: made by Nippon Electric Glass Co., Ltd.) as a fibrous reinforcing filler from a side-feeder equipped to the extruder. By this process a resin composition was obtained.

EVALUATION METHOD

After drying the resin composition obtained by the process of above-mentioned Example 1 at 140° C. for 4 hours, bars having 1/32 inch, 1/16 inch and 1/4 inch thickness (12.7 mm width, 127 mm length in each) and #1 dumbbell test pieces according to ASTM were molded with using an 50 t injection molding machine under a condition of cylinder temperature at 280° C. and metal mold temperature at 60° C. And plate test pieces (120×120×3 mm size) were molded with using a 75 t injection molding machine under a condition of cylinder temperature at 270° C. and metal mold temperature at 90° C. Then, the following evaluations were carried out and the obtained results are shown in Table 1-1.

Flame-Retardance

The evaluation of flame-retardance was conducted according to the UL94 vertical flame test standard with using 1/32 inch and 1/16 inch bars.

Surface Resistance

A conductive resin (trademark/DawtightD-550: made by Fujikura Chem., Co.) was painted to two points on the surface of dumbbell test piece (painted area was 12.5 mm×16 mm, gap between the two pained points was 8 mm), and the painted points were dried and solidified, then they were used as electrodes. The resistance value between the two electrodes was measured by using tester, and the surface resistance was calculated based on the following formula (1).

$$(\text{surface resistance } \Omega/\Delta) = R \times 12.5/8 \quad (1)$$

Volume Intrinsic Resistance

The resistance value was measured according to ASTM D-257 standard with using test plates (120×120×3 mm size), and the volume intrinsic resistance was calculated from it.

Tensile Strength

The tensile strength test was measured according to ASTM D-638 standard with using the dumbbells, and the maximum strength was searched.

Thermal Resistance

Heat distortion temperature (HDT) at 1.82 MPa load was evaluated according to ASTM D-648 standard with using 1/4 inch bar.

EXAMPLES 2~8

The resin compositions were obtained in the same manner as described in Example 1 except with using:

(A-2) polytetramethylene terephthalate having 0.9 intrinsic viscosity as a thermoplastic polyester,
(B-2) brominated diphenylethane (trademark/Saytex 8010: made by Albemarl Co.: 82% bromine contents),
(C-2) sodium antimonate (trademark/Sun-epock 1070L: made my Nissan Chem. Co.) as an antimony compound
(G-2) epoxy resin (trademark/Epicoat828: made by Yuka-Shell Epoxy Co.: 185 of its epoxy equivalency) as a multifunctional compound,
(G-3) aromatic polycarbodiimide (trademark/Stabacsol P: made by Bayer A.G.), and formulation of which are shown in Table 1. And the equivalent of each Example was carried out in the same manner as described in Example 1. The obtained results are shown in Table 1-1 and Table 1-2.

TABLE 1-1

| | Examples | | | |
|---|---|---|---|---|
| | 1 | 2 | 3 | 4 |
| (A-1) Polyethylene terephthalate | 100 | 100 | 100 | 100 |
| (A-2) Polytetramethylene terephthalate | — | — | — | — |
| (B-1) Brominated polystyrene | 18 | — | 22 | 9 |
| (B-2) Brominated diphenylethane | — | 19 | — | — |
| (C-1) Antimony trioxide | 2 | — | 3 | — |
| (C-2) Sodium antimonate | — | 1 | — | 0.5 |
| (D-1) Conductive carbon black | 7.7 | 11.0 | 4.5 | 8.8 |
| (E-1) Glass fiber | 40 | 40 | 40 | 40 |
| (F-1) Copolymer | 20 | 20 | 20 | 20 |
| (F-2) Sodium p-t-butylbenzoate | 0.2 | — | — | 0.2 |
| (F-3) Partial sodium salt of ethylene-methacrylic acid copolymer | 3.5 | 3.5 | 4.2 | 4.2 |
| (G-1) Divalent oxazoline compound | 0.5 | — | — | — |
| (G-2) Epoxy resin | — | 0.4 | 0.1 | — |
| (G-3) Aromatic carbodiimide | — | — | — | 1.0 |
| (Stabilizer) A0-60 | 0.5 | 0.5 | 0.5 | 0.5 |
| Weight ratio of Br/Sb | 7.3/1 | 24.9/1 | 6.0/1 | 14.7/1 |
| Flame-retardance | | | | |
| (1/16″) | V-1 | V-1 | V-0 | V-1 |
| (1/32″) | V-0 | V-0 | V-0 | V-0 |
| Surface resistance ($\Omega/\square$) | $10^4$ | $10^2$ | — | $10^3$ |
| Volume intrinsic resistance ($\Omega \cdot$ cm) | — | — | $10^{11}$ | — |
| Tensile strength (kg/cm$^2$) | 1100 | 1100 | 1200 | 1100 |
| HDT (° C.) | 208 | 208 | 210 | 208 |

TABLE 1-2

| | Examples | | | |
|---|---|---|---|---|
| | 5 | 6 | 7 | 8 |
| (A-1) Polyethylene terephthalate | 100 | 100 | 30 | — |
| (A-2) Polytetramethylene terephthalate | — | — | 70 | 100 |
| (B-1) Brominated polystyrene | 18 | 18 | — | — |
| (B-2) Brominated diphenylethane | — | — | 20 | 28 |
| (C-1) Antimony trioxide | 2 | 2 | 1.5 | 1 |
| (C-2) Sodium antimonate | — | — | — | — |
| (D-1) Conductive carbon black | 7.7 | 7.7 | 4.0 | 4.0 |
| (E-1) Glass fiber | 40 | 40 | 32 | 34 |
| (F-1) Copolymer | 20 | — | — | — |
| (F-2) Sodium p-t-butylbenzoate | 0.2 | — | — | — |
| (F-3) Partial sodium salt of ethylene-methacrylic acid copolymer | 3.5 | — | — | — |
| (G-1) Divalent oxazoline compound | — | 0.5 | 0.1 | — |
| (G-2) Epoxy resin | — | — | — | — |
| (G-3) Aromatic carbodiimide | — | — | — | — |
| (Stabilizer) A0-60 | 0.5 | 0.5 | 0.5 | 0.5 |
| Weight ratio of Br/Sb | 7.3/1 | 7.3/1 | 13.0/1 | 27.4/1 |
| Flame-retardance | | | | |
| (1/16″) | V-1 | V-1 | V-0 | V-0 |
| (1/32″) | V-0 | V-0 | V-0 | V-0 |
| Surface resistance ($\Omega/\square$) | $10^4$ | $10^4$ | — | — |
| Volume intrinsic resistance ($\Omega \cdot$ cm) | — | — | $10^{12}$ | $10^{12}$ |
| Tensile strength (kg/cm$^2$) | 950 | 1000 | 1150 | 1200 |
| HDT (° C.) | 205 | 198 | 183 | 180 |

COMPARATIVE EXAMPLE 1

100 parts of polyethylene terephthalate (A-1) having 0.6 of its logarithmic viscosity as a thermoplastic polyester, 16 parts of brominated polystyrene (B-1) (Pilocheck 68PB: 68% of bromine content ratio) as a bromine-type flame-retardant, 4 parts of antimony trioxide (C-1) (Antimony Oxide C) as an antimony compound, 7.7 parts of conductive carbon black (D-1) Ketchen Black EC600JD), 20 parts of copolymer of Reference Example 1 (F-1), 0.2 parts of sodium p-t-butylbenzoate (F-2) (Nonesal TBAN), and 3.5 parts of partial sodium salt of ethylene-methacrylic acid (F-3) (Hi-Miten 1707: its neutralization ratio is 50%) as crystallizing accelerators (F), 0.5 parts of divalent oxazoline compound (G-1) (Bisoxazoline 1,3-PBO) as a multifunctional compound, and 0.5 parts of Adekastab A0-60 as a stabilizer were added in and mixed. And then the mixture was put into the hopper of a twin screw extruder equipped with a vent (TEX44), of which barrel temperature was set at 280° C. And the mixture was melt-kneaded together with adding 40 parts of glass fibers (T-195H) as a fibrous reinforcing filler from a side-feeder equipped to the extruder. By this process a resin composition was obtained. The evaluation of the resin composition was carried out in the same manner as described in Example 1. The obtained results are shown in Table 2.

COMPARATIVE EXAMPLES 2~6

The resin compositions were obtained in the same manner as described in Comparative Example 1, except with using:

(A-2) polytetramethylene terephthalate having 0.9 intrinsic viscosity as a thermoplastic polyester, (B-2) brominated diphenylethane (Saytex 8010: 82% bromine contents), (C-2) sodium antimonate (Sun-epock 1070L) as an antimony compound (G-2) epoxy resin (Epicoat 828: 185 of its epoxy equivalency) as a multifunctional compound, formulations of which are shown in Table 2. And the evaluation of each Comparative Example was carried out in the same manner as in Comparative Example 1. The obtained results are shown in Table 2.

It is apparent from comparing Examples which results are shown in Table 1-1 and 1-2 with Comparative Examples which results are shown in Table 2 that the polyester-type resin compositions of the present invention have excellent properties in flame-retardance, anti-staticity, mechanical strength and thermal resistance. And it is apparent from comparing Example 1 with Example 5 and 6 that the mechanical strength and the thermal resistance can be further improved by addition of the crystallizing accelerator (F) and the multifunctional compound (G) without sacrificing its flame-retardance and anti-staticity.

INDUSTRIAL APPLICABILITY

The polyester-type resin composition of the present invention has excellent properties in flame-retardance, anti-staticity, mechanical strength and thermal resistance, therefore it is preferably usable for various applications, in particular electrical and electronic mechanical parts field.

What is claimed is:

1. A flame-retardant anti-static polyester resin composition which comprises 100 parts by weight of thermoplastic polyester (A), from 1 to 35 parts by weight of bromine flame retardant (B), from 0.1 to 5 parts by weight of antimony compound (C), and from 3 to 12 parts by weight of particulate conductive carbon black (D) for imparting anti-static properties to the composition, wherein the Br/Sb ratio in said polyester resin composition is from 5.5/1 to 35.0/1 for creating anti-static composition with improved flame retardancy such that carbonized combustion can be averted and maintaining mechanical strength and thermal resistance of the composition.

2. A flame-retardance anti-static polyester resin composition as described in claim 1, wherein a reinforcing filler (E) is added.

TABLE 2

|  | Comparative Examples | | | | | |
| --- | --- | --- | --- | --- | --- | --- |
|  | 1 | 2 | 3 | 4 | 5 | 6 |
| (A-1) Polyethylene terephthalate | 100 | 100 | 100 | 100 | 30 | 30 |
| (A-2) Polytetramethylene terephthalate | — | — | — | — | 70 | 70 |
| (B-1) Brominated polystyrene | 16 | 19.6 | — | — | — | — |
| (B-2) Brominated diphenylethane | — | — | 15 | 19.4 | 15 | 21 |
| (C-1) Antimony trioxide | 4 | 0.4 | — | — | 6.5 | 0.5 |
| (C-2) Sodium antimonate | — | — | 5 | 0.6 | — | — |
| (D-1) Conductive carbon black | 7.7 | 7.7 | 11.0 | 11.0 | 4.0 | 4.0 |
| (E-1) Glass fiber | 40 | 40 | 40 | 40 | 32 | 32 |
| (F-1) Copolymer | 20 | 20 | 20 | 20 | — | — |
| (F-2) Sodium p-t-butylbenzoate | 0.2 | 0.2 | — | — | — | — |
| (F-3) Partial sodium salt of ethylene-methacrylic acid copolymer | 3.5 | 3.5 | 3.5 | 3.5 | — | — |
| (G-1) Divalent oxazoline compound | 0.5 | 0.5 | — | — | 0.1 | 0.1 |
| (G-2) Epoxy resin | — | — | 0.4 | 0.4 | — | — |
| (Stabilizer) A0-60 | 0.5 | 0.5 | 0.5 | 0.5 | 0.5 | 0.5 |
| Weight ratio of Br/Sb | 3.3/1 | 40.4/1 | 3.8/1 | 41.9/1 | 2.3/1 | 41.0/1 |
| Flame-retardance |  |  |  |  |  |  |
| (1/16") | Not V | Not V | Not V | Not V | Not V | Not V |
| (1/32") | Not V | V-2 | Not V | V-2 | Not V | V-2 |
| Surface resistance ($\Omega/\square$) | $10^4$ | $10^4$ | $10^2$ | $10^2$ | — | — |
| Volume intrinsic resistance ($\Omega \cdot cm$) | — | — | — | — | $10^{12}$ | $10^{12}$ |
| Tensile strength ($kg/cm^2$) | 1100 | 1100 | 1100 | 1100 | 1150 | 1150 |
| HDT (° C.) | 208 | 208 | 208 | 208 | 183 | 183 |

3. A flame-retardant anti-static polyester resin composition as described in claim 1 or 2, wherein a crystallizing accelerator (F) is added in further.

4. A flame-retardant anti-static polyester resin composition as described in claim 1 or 2, wherein a multifunctional compound (G) is added in further.

5. A flame-retardant anti-static polyester resin composition as described in claim 1 or 2, wherein a crystallizing accelerator (F) and a multifunctional compound (G) are added in further.

6. The flame-retardant anti-static polyester resin composition according to claim 1, wherein the thermoplastic polyester (A) is a compound selected from the group consisting of polyethylene-terephthalate, polypropylene-terephthalate, polytetramethylene-terephthalate, and polyhexamethylene-terephthalate.

7. The flame-retardant anti-static polyester resin composition according to claim 1, wherein the thermoplastic polyester (A) has a logarithmic viscosity of 0.44 to 2.0 when measured with using phenol: 1,1,2,2-tetrachloroethane, having a 1:1 weight ratio mixed solvent at 25° C.

8. The flame-retardant anti-static polyester resin composition according to claim 1, wherein the ratio of bromine incorporated in the brominated flame-retardant is 20 wt % or more.

9. The flame-retardant anti-static polyester resin composition according to claim 1, wherein the weight ratio of Br/Sb is in a range of 6.0/1 to 32.0/1.

* * * * *